United States Patent [19]

Casagrande

[11] 4,087,733

[45] May 2, 1978

[54] BATTERY CHARGER

[75] Inventor: Serge Casagrande, Windsor, Canada

[73] Assignee: Controlled Systems (Windsor) Limited, Windsor, Canada

[21] Appl. No.: 687,461

[22] Filed: May 18, 1976

[30] Foreign Application Priority Data

Jul. 29, 1975 Canada .................................. 232415

[51] Int. Cl.² ............................................... H02J 7/04
[52] U.S. Cl. ....................................... 320/21; 320/23; 320/37; 320/39
[58] Field of Search ...................... 320/32, DIG. 2, 39, 320/40, 37, 23, 25, 22

[56] References Cited

U.S. PATENT DOCUMENTS

| 3,586,955 | 6/1971 | Kisiel | 320/32 X |
| 3,930,197 | 12/1975 | Saylor | 320/25 X |
| 3,944,904 | 3/1976 | Hase | 320/39 X |

Primary Examiner—Robert J. Hickey
Attorney, Agent, or Firm—Fleit & Jacobson

[57] ABSTRACT

A battery charger in which full-wave rectified current is supplied to a battery through a silicon controlled rectifier. By controlling the gating of the SCR the average charging current is controlled. An oscillator circuit formed by a unijunction transistor with a timing capacitor in its emitter circuit provides the necessary gating pulses. The charging rate of the capacitor is controlled to alter the period during which the SCR is conductive. This control of the charging rate is provided by a circuit responsive to battery voltage and by a circuit responsive to charging current. A portion of the battery-voltage responsive circuit acts to short-circuit the capacitor to stop charging in the event that the battery is connected with reverse polarity. A high charging-rate mode is controlled by a timer circuit which overrides the normal voltage and current control circuits.

2 Claims, 2 Drawing Figures

BATTERY CHARGER

BACKGROUND OF THE INVENTION

This invention relates to battery chargers and, in particular, to battery chargers having control circuits including reverse polarity protection and high-rate charging control.

It is known to provide a battery charger in which full-wave rectified current is supplied to a battery through a silicon controlled rectifier. By controlling the timing of the gating pulse applied to the SCR the average charging current is controlled. An oscillator circuit formed by a unijunction transistor with a timing capacitor in its emitter circuit provides the necessary gating pulses. The charging rate of the capacitor is controlled to alter the period during which the SCR is conductive. This control of capacitor charging rate is provided by a circuit responsive to battery voltage and by a circuit responsive to charging current.

SUMMARY OF THE INVENTION

The present invention provides an improved battery charger having a source of unidirectional current pulses adapted to be supplied to a battery. A controllable switching device is provided in series with the current source. A controllable current source operating in synchronism with the current pulses is connected to a timing capacitor. A gating circuit including a unijunction transistor has its emitter circuit connected to the timing capacitor and produces control pulses coupled to the switching device to place it in conduction for a portion of the period of each unidirectional current pulse. The control pulses are in synchronism with said current pulses but have a variable period with respect thereto. A battery-voltage responsive control circuit produces a first signal indicative of the difference between the battery voltage and a reference voltage. This signal is coupled to the controllable current source to control the charging rate of the capacitor. A battery-current responsive circuit produces a second signal indicative of the average battery charging current. A transistor linearly responsive to the second signal is connected in parallel with the timing capacitor to shunt current therefrom.

The invention provides a further battery-voltage responsive circuit adapted to short-circuit the capacitor and stop charging if the battery is connected with reverse polarity. The invention further provides for a high charging-rate mode, controlled by a timer circuit which overrides the normal voltage and current control circuits.

DESCRIPTION OF THE PREFERRED EMBODIMENT

Figure 1:
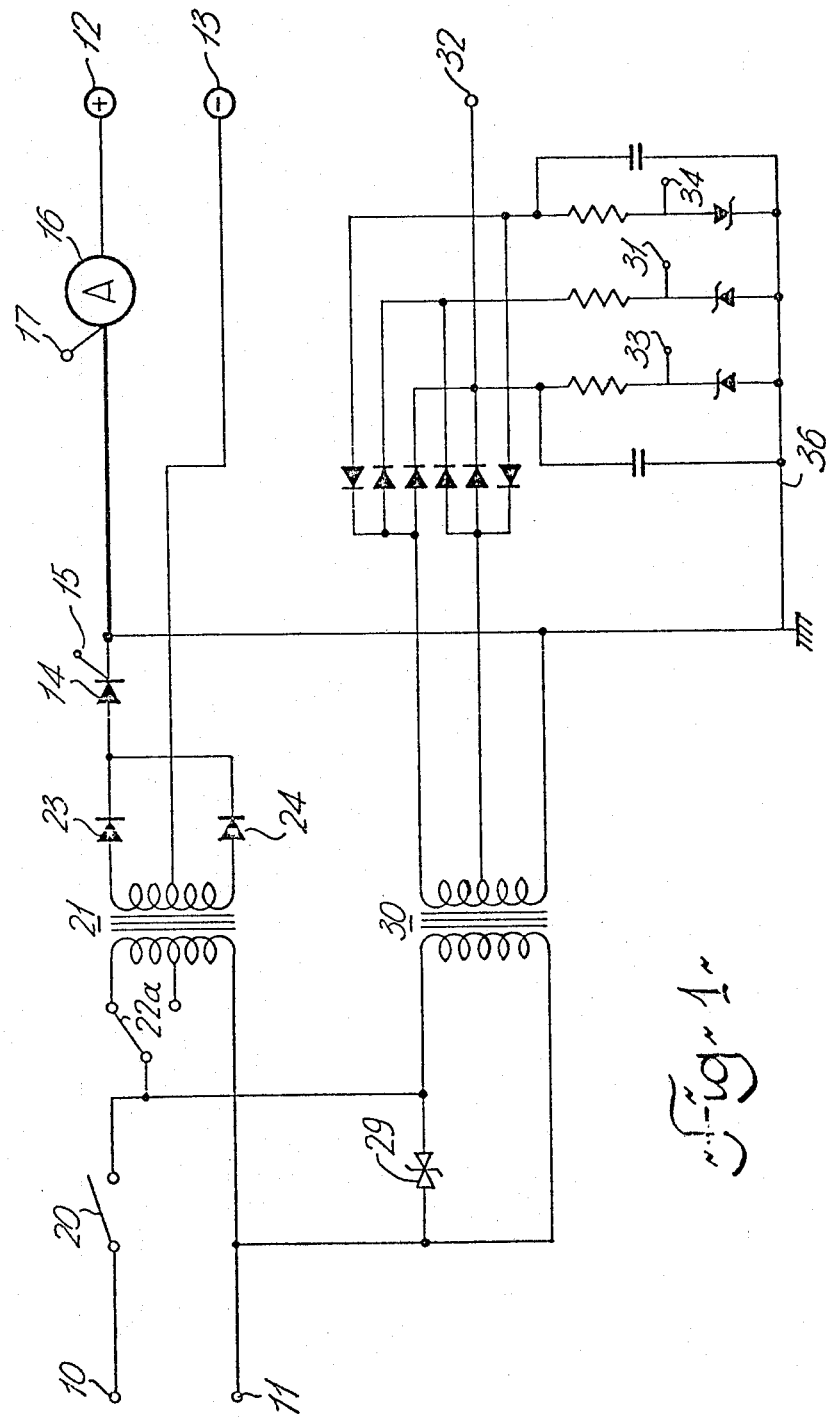
FIG. 1 shows the power supply circuit of a battery charger incorporating this invention.

FIG. 1 shows the power supply circuit of the battery charger in which a c power applied to terminals 10 and 11 is transformed, rectified and supplied to terminals 12 and 13 for connection to a battery. The current pulses supplied to the battery have their duration controlled by a silicon controlled rectifier (SCR) 14 having a control gate connected to a terminal 15. A meter 16 is in series with the current supply and a measuring shunt (typically 1 ft. #4 copper cable) extends between the SCR and a terminal 17 to provide a control voltage indicative of the load current.

Terminals 10 and 12 are connected to a transformer 21 via an off/on switch 20 and a battery voltage selector switch 22a so that the appropriate winding of transformer 21 is energized, depending on whether a 6-volt or 12-volt battery is to be charged. A ganged portion of the switch (22b in FIG. 2) adjusts the battery-voltage control circuit accordingly. The secondary winding of transformer 21 is center tapped and connected to terminal 13. The output voltage is full-wave rectified in the conventional manner by rectifiers 23 and 24 having their cathodes coupled together and to the anode of SCR 14.

Several voltages required for operation of the control circuit are derived from rectifying circuits connected to a transformer 30, supplied from terminals 10 and 11. A voltage limiting device 29 is connected across the primary of transformer 30 and the secondary voltage is full-wave rectified to supply the different voltages required for the operation of the control circuit. Typical voltages required in the preferred embodiment are a 15-volt clipped supply at terminal 31 and a 24-volt smoothed supply at terminal 32. Additional positive and negative voltages available at terminals 33 and 34 may be useful for a commercial operational amplifier used in the current control circuit.

Figure 2:
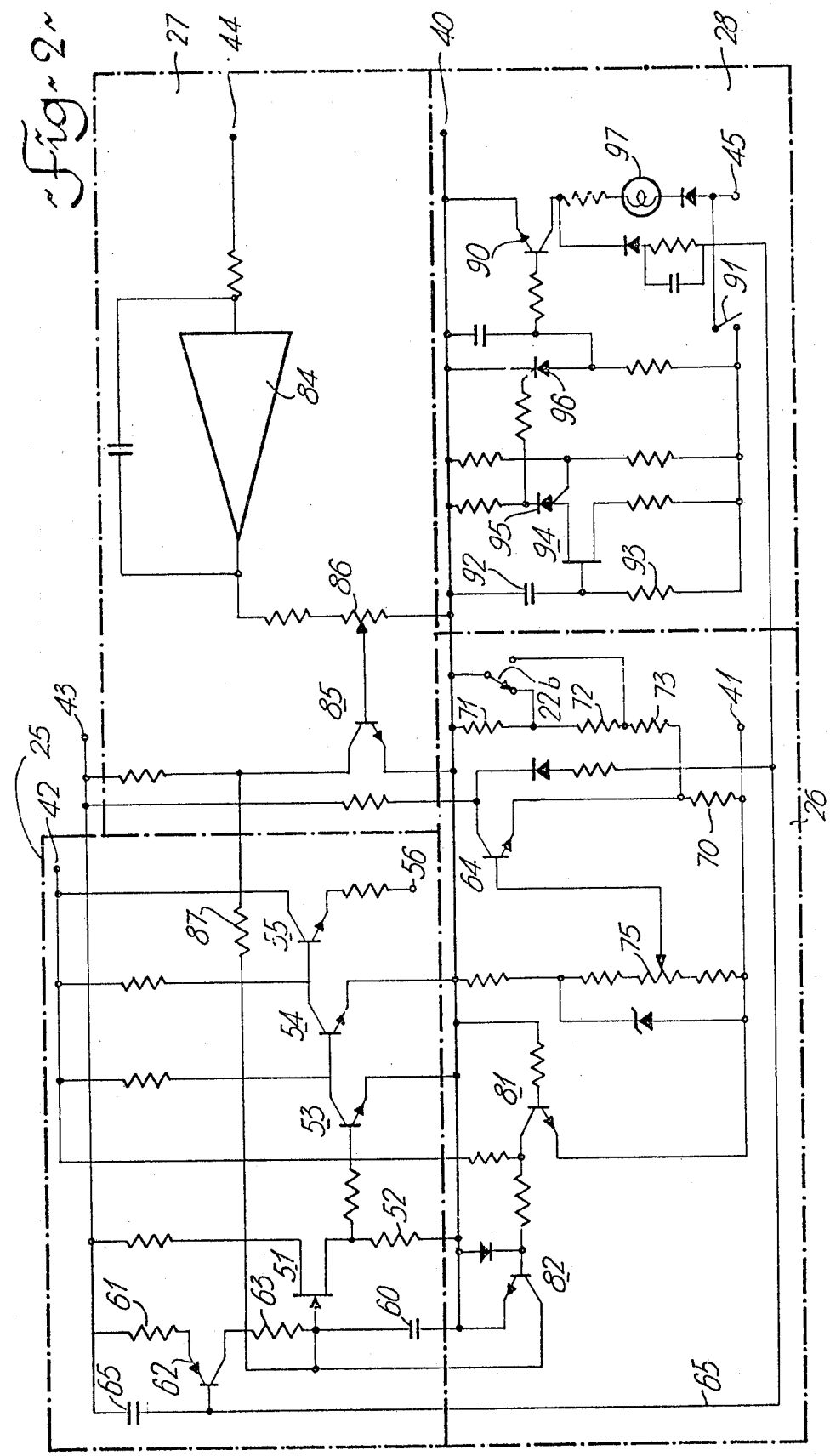
FIG. 2 shows the control circuit of the battery charger of this invention.

The control circuit, shown in FIG. 2, has four separate functional parts indicated by the chain-dotted lines. These are the oscillator section 25, the voltage control section 26, the current control section 27 and the timer section 28. The smoothed voltage supply from terminal 32 is applied to terminals 42 and 45. The clipped supply from terminal 31 is applied to terminal 43. Terminal 40 is connected to common line 36 of the power supply and terminal 41 is connected to terminal 13 which, in turn, is connected to the negative terminal of the battery.

Oscillator section 25 provides appropriate triggering pulses at terminal 56 for connection to the gate of the SCR via terminal 15. As is known, when these pulses occur early in the, typically 60Hz, power supply waveform then SCR 14 is switched on for a large portion of each cycle and appropriately increased charging current is supplied to the battery. When the triggering pulses occur later in the 60Hz wave-form the charging current is appropriately reduced and in the case of complete absence of triggering pulses, there is no charging current.

The oscillator circuit includes a unijunction transistor 51 providing output pulses across a resistor 52 which are amplified by transistors 53, 54 and 55 providing the necessary pulse at terminal 56 for connection to the gate of the SCR. A capacitor 60 is connected between the emitter electrode of unijunction transistor 51 and common line 40 to provide the basic timing control element. Line 40 is connected to common line 36 of the power supply circuit which is also connected to the positive terminal of the battery. Capacitor 60 is charged through a first path formed by resistor 61, transistor 62 and resistor 63. When transistor 62 is conducting, capacitor 60 charges with a time constant determined by the level of conduction of transistor 62. When the capacitor reaches a certain voltage, unijunction transistor 51 fires, hence providing an appropriate trigger pulse at terminal 56 for the SCR. The further transistor 62 is driven into conduction, the faster the voltage across the capacitor will rise and the earlier the timing pulse will appear in the sequence of events. The voltage supplied to terminal 43 is a pulsating full-wave rectified voltage from terminal 32 and, hence, the various voltages in the control circuit have the same periodicity and are in synchronism with the wave-form applied to the SCR. Capacitor 65 connected to the base of transistor 62 provides a smoothing action for the control voltage applied to that base.

Referring now to the voltage control section 26, it has been pointed out that terminal 40 is connected to line 36 and, hence, senses, through the meter and current shunt, the voltage appearing at the battery positive terminal. Terminal 41 is connected to terminal 13 and, hence, the battery negative terminal. A portion of the battery voltage applied to resistor chain 71, 72, 73 and 70 is sensed across resistor 70. Switch 22b, ganged with switch 22a, selects an appropriate fraction of the battery voltage depending on whether a 6-volt or a 12-volt battery is being charged. The portion of the battery voltage appearing across resistor 70 is compared with a reference voltage supplied to the base of transistor 64. This reference voltage is supplied from a tap on a potentiometer 75 forming part of a zener diode stabilized voltage divider chain. When the battery sample voltage falls below the reference voltage, transistor 64 conducts thereby lowering the potential at its collector. This lowered potential coupled to the base of transistor 62 drives it further into conduction increasing the rate at which capacitor 60 is charged and, hence, advancing the point in the cycle at which unijunction transistor 51 fires and turns on the SCR.

Transistors 81 and 82 provide protection against damage in case the battery is connected across terminals 12 and 13 with reverse polarity. In this event, reverse polarity is also applied to terminals 40 and 41 and transistor 81 is cut off, transistor 82 is driven into saturation by the positive voltage from terminal 42 whereby it short-circuits capacitor 60, thereby inhibiting oscillation action and stopping all operation of the charging circuit since the SCR never fires.

Current control section 27 includes an operational amplifier 84 connected in an integrating mode. The power supplies for the operational amplifier (not shown) may be obtained from terminals 33 and 34. The input voltage to this amplifier is the pulsating low voltage appearing across current shunt at terminals 15 and 17. The integrated and, hence, smoothed output voltage is applied to transistor 85 via a potentiometer 86. As the battery charging current increases, transistor 85 turns on thereby lowering the voltage at its collector and bleeding off current which would otherwise charge capacitor 60 via resistor 87. The voltage applied to the collector of transistor 85 is pulsating in synchronism with the rectified current since it is obtained from terminal 31 via terminal 43.

Timer section 28 ensures that a battery may be charged at a high rate for a limited and controlled period. The high rate of charge is provided under the control of transistor 90. When high-rate charging is initiated by closing switch 91, connecting the circuit to a positive voltage supply via terminal 45 transistor 90 is biased into conduction which, in turn, switches on transistor 62 and permits the charger to operate at a high rate independently of the input from voltage control section 26. With the initiation of the charging sequence a timer circuit formed by capacitor 92 and resistor 93 is energized. Capacitor 92 begins to charge slowly via resistor 93 and FET 94, having a very high input impedance, follows the voltage rise across capacitor 92. At a specified voltage a unijunction transistor 95 fires. The firing of transistor 95 turns on SCR 96, thereby switching off transistor 90 and terminating the charging process. An indicator light 97, in circuit with transistor 90, shows when the high charging rate is in effect. Because of the high input impedance of FET 94, a standard capacitor 92 can be used to provide timing duration of several hours thus permitting the use of readily available components.

Although the circuit has been described with regard to a battery charger for 6-volt and 12-volt batteries, it will be clear that by a suitable choice of transformer and values for resistor chain 70, 71, 72, 73, batteries of widely varying voltages can be charged. In practice, 72-volt batteries have been successfully charged. The protection circuit formed by transistors 81 and 82 is of sufficient sensitivity to be activated by a battery voltage as low as 0.8 volts. If the output cables are shorted together then the charger remains shut off since transistor 81 has the same potential applied to base and emitter and is cut off. By using a zener diode with a negative temperature coefficient to feed resistor chain 75, the battery charger can be operated to provide a higher charge on colder days than on warmer days.

I claim:

1. A battery charger comprising a source of unidirectional current pulses adapted to be supplied to a battery,
    a controllable switching device in series with said current source,
    a timing capacitor,
    a controllable current source operating in synchronism with the current pulses and connected to the timing capacitor,
    a gating circuit including a unijunction transistor with its emitter circuit connected to the timing capacitor, producing control pulses coupled to said switching device to place it in conduction for a portion of the period of each unidirectional current pulse, said control pulses being in synchronism with said current pulses but having a variable period with respect thereto,
    a battery voltage responsive control circuit producing a signal indicative of the difference between the battery voltage and a reference voltage, said signal being coupled to the controllable current source to control the charging rate of said capacitor,
    transistor switching means coupled to the controllable current source to override the signal from the voltage control circuit and place said controllable current source in a condition of maximum supply, and timer means controlling said transistor switching means to limit the period of maximum supply.

2. A battery charger comprising a source of unidirectional current pulses adapted to be supplied to a battery,
    a controllable switching device in series with said current source,
    a first timing capacitor,
    a controllable current source operating in synchronism with the current pulses and connected to the timing capacitor,
    a gating circuit including a unijunction transistor with its emitter circuit connected to the timing capacitor, producing control pulses coupled to said switching device to place it in conduction for a portion of the period of each unidirectional current pulse, said control pulses being in synchronism with said current pulses but having a variable period with respect thereto, a battery voltage responsive control circuit producing a signal indicative of the difference between the battery voltage and a reference voltage, said signal being coupled to the controllable current source to control the charging rate of said capacitor, transistor switching means coupled to the controllable current source to override the signal from the voltage control circuit and place said controllable current source in a condition of maximum supply, and timer means controlling said transistor switching means, said timer means including an FET, a second timing capacitor connected in the gate circuit of the FET, said second timing capacitor being charged from the power supply for said transistor switching means.

* * * * *